US012731819B2

(12) United States Patent
Tirler et al.

(10) Patent No.: US 12,731,819 B2
(45) Date of Patent: Sep. 8, 2026

(54) MOBILE SYSTEM FOR THE TREATMENT OF ACCUMULATORS, BATTERIES AND THE LIKE, IN PARTICULAR FOR THE TREATMENT OF LAND VEHICLE BATTERIES

(71) Applicant: Eco-Research, Bozen Bolzano (IT)

(72) Inventors: Werner Tirler, Bolzano (IT); Giulio Voto, Bolzano (IT)

(73) Assignee: Eco-Research, Bozen-Bolzano (IT)

( * ) Notice: Subject to any disclaimer, the term of this patent is extended or adjusted under 35 U.S.C. 154(b) by 662 days.

(21) Appl. No.: 18/249,786

(22) PCT Filed: Oct. 18, 2021

(86) PCT No.: PCT/EP2021/078753
§ 371 (c)(1),
(2) Date: Apr. 20, 2023

(87) PCT Pub. No.: WO2022/084219
PCT Pub. Date: Apr. 28, 2022

(65) Prior Publication Data

US 2024/0009718 A1 Jan. 11, 2024

(30) Foreign Application Priority Data

Oct. 23, 2020 (IT) ........................ 102020000025144

(51) Int. Cl.
*H01M 10/42* (2006.01)
*A62C 3/07* (2006.01)
(Continued)

(52) U.S. Cl.
CPC ............... *H01M 10/42* (2013.01); *B09B 3/40* (2022.01); *H01M 10/54* (2013.01); *A62C 3/07* (2013.01);
(Continued)

(58) Field of Classification Search
None
See application file for complete search history.

(56) References Cited

U.S. PATENT DOCUMENTS

2018/0289996 A1* 10/2018 Kim ....................... A62C 37/04
2022/0275474 A1* 9/2022 Tirler .................... H01M 10/54

FOREIGN PATENT DOCUMENTS

DE 102013210154 12/2014
DE 202015102822 6/2015
(Continued)

OTHER PUBLICATIONS

DE-102019127014-A1 (Year: 2021).*
ID-S202203417A (Year: 2022).*
International Search Report.

*Primary Examiner* — Gregg Cantelmo
(74) *Attorney, Agent, or Firm* — Dunlap Bennett & Ludwig PLLC

(57) ABSTRACT

A mobile system (100) for treating an accumulator, a battery, a cell and/or a vehicle that includes an accumulator, a battery, a cell. The system is arranged on a mobile vehicle, e.g. a truck, a trailer, the system comprising at least one container/reactor (101) in which the pressure can be increased from 2 to 40 bar, and the container/reactor having at least one door (102) for hermetically opening and closing the container/reactor (101), a heating element/device 110 for raising the temperature inside the container/reactor to at least 100° C. and at least one H2O supply.

7 Claims, 1 Drawing Sheet

(51) Int. Cl.

| | |
|---|---|
| ***A62C 3/16*** | (2006.01) |
| ***B09B 3/40*** | (2022.01) |
| ***B09B 101/16*** | (2022.01) |
| ***H01M 10/54*** | (2006.01) |

(52) U.S. Cl.
CPC ............. *A62C 3/16* (2013.01); *B09B 2101/16* (2022.01); *H01M 2200/00* (2013.01)

(56) References Cited

FOREIGN PATENT DOCUMENTS

| | | | | |
|---|---|---|---|---|
| DE | 102019127014 | A1 * | 4/2021 | ............... A62C 3/07 |
| EP | 4105078 | A1 * | 12/2022 | ............ B60P 1/6418 |
| WO | 2014016069 | | 1/2014 | |
| WO | WO-2018222046 | A1 * | 12/2018 | ........ H01M 10/6567 |
| WO | 2021009199 | | 1/2021 | |

* cited by examiner

MOBILE SYSTEM FOR THE TREATMENT OF ACCUMULATORS, BATTERIES AND THE LIKE, IN PARTICULAR FOR THE TREATMENT OF LAND VEHICLE BATTERIES

BACKGROUND OF THE INVENTION

The invention relates to a mobile system for the treatment of accumulators, batteries and the like, in particular for the treatment of land vehicle batteries.

Due to the increased use of rechargeable batteries and accumulators, the problem of handling batteries and accumulators that are present in land vehicles, especially in machines that no longer work after a breakdown and/or an accident and have to be dealt with by emergency services such as fire brigades. These accumulators and/or batteries pose a risk of explosion and thus a risk of injury for the emergency services.

According to the current state of the art, the emergency services either place the entire vehicle in a water tank or fill it with foam and then have to transport it in a tank or by means of a special transport with the necessary precautions, since the vehicle and the battery, i.e. the accumulator in the vehicle, can explode at any time, since the chemical reaction inside the accumulator/battery can take place without being noticed from the outside.

SUMMARY OF THE INVENTION

The inventive system solves the problem by making the accumulator/battery harmless on site and then enabling a simple, safe and inexpensive transport, e.g. with a known tow truck.

The method according to the invention, used in a system according to the invention operating in an aqueous/wet phase, does not generate toxic and potentially corrosive fumes, which is a critical aspect that is not solved in the cited inventions, but which means that the phases that can lead to the emission of potentially hazardous substances are made to react with the liquid/humid environment.

This means that the method according to the invention is safe from an environmental point of view, both in terms of possible emissions into the atmosphere during the treatment phase and in terms of residues of potentially toxic substances that can possibly contaminate the parts intended for recycling or sale as raw materials with regard to the disposal of waste in accordance with Directive 2008/82/EC.

At the end of the process carried out in the system according to the invention, a residue is obtained which has lost its chemical reactivity (and hazardousness) and which can be used for the recovery of substances (e.g. Li, Co, Ni, Mn, other metals and also fluorine) present in the battery by hydrometallurgical means.

In the present description, batteries are understood to be any battery, accumulator, electrically chargeable cells and all means that are used to store electrical energy.

The purpose of the present invention is to neutralise accumulators and batteries on site in order to enable accumulators and batteries and/or land vehicles with these items to be transported away safely and quickly.

This purpose is achieved by a mobile system according to the characterizing part of the independent claim.

A system arranged on a towed and/or self-propelled vehicle is proposed, which comprises at least one preferably cylindrical container, the container having a door for access to the inside and a water inlet and/or outlet. This also includes at least one element/device for heating the water.

In the system according to the invention, the following procedure is carried out, consisting of the following steps:

- Introduction of an accumulator, a battery, a cell, which may contain lithium, sodium-lithium ions, potassium and/or nickel, into a chamber/reactor and/or a vehicle with an accumulator, a battery and/or a cell,
- adding demineralized water (H2O) or even regular industrial tap water,
- closing the door and
- heating up everything to a temperature above 100° C. and below 370° C. at a pressure of between 2 and 40 bar.

Advantageously, the water is supplied on site, for example by the fire brigade.

In a preferred embodiment the system comprises a gas outlet and in a particularly preferred embodiment this outlet is fitted with an activated carbon filter.

Advantageously, the vehicle on which the system according to the invention is located has a ramp for placing a vehicle with a battery and/or an accumulator into the container.

Advantageously, a towing system can be provided, for example a towing system known from breakdown vehicles, mounted on the system to tow the battery, accumulator or cell, with or without a vehicle, directly into the container where the reaction takes place. In this way, the vehicle and/or the battery, accumulator or cell is towed into the container without endangering the operator.

After the batteries, accumulators to be treated or the vehicle with the batteries, accumulators are introduced into the container, water is added and the temperature is raised for hydrothermal treatment. The temperature is advantageously increased to approximately 200° C.-220° C. Under these operating conditions, the separator between the anode and cathode degrades, causes to short-circuit the battery and to loose its remaining power, leading to an exothermic reaction with a corresponding rise in temperature and pressure in the container (inner chamber/reactor). The active material contained in the battery (e.g. lithium) quickly hydrolyzes and forms compounds that are no longer dangerous. The presence of H2O, i. e. the humid environment, limits the temperature rise in the battery body, which could lead to the decomposition of the plastic parts. The humid environment dampens temperature fluctuations and also binds the aggressive substances released from the battery. In this way, dangerous chemical reactions and the release of toxic gases can be avoided.

All of these processes require water, which must be supplied to the inner chamber/reactor in sufficient quantity. The amount of water in relation to the batteries/accumulators to be treated is preferably in a weight ratio of 1/1 to 10/1.

At the end of the process, the inner chamber/reactor is cooled down and the materials, in particular cobalt, magnesium, iron, aluminium and lithium, can be recovered by hydrometallurgy.

This process also allows easy and safe later recycling as there are no dangerous exothermic and/or chemical reactions that could be dangerous to humans. In addition, since toxic gases are no longer present, the inner chamber/reactor in which the recycling processes take place do not have to follow strict protocols and do not have to be equipped with emission control systems to remove hazardous gases from the exhaust gases. In addition, batteries, accumulators and the like treated in this way can be safely transported after the treatment. This is a significant advantage since, for example, the batteries of electric cars are also very large and, to avoid risks during transport, must be placed in special containers that can withstand any exothermic reactions.

Therefore, the transport of such batteries without treatment would be very bulky and expensive.

A battery or accumulator which has been treated in a system according to the method of the invention no longer has these problems and can be transported easily and economically. In addition, due to the relatively low temperatures and pressures used, many of the risks typically associated with thermal destruction processes are eliminated.

In a preferred embodiment, the inner chamber/reactor is flushed with an inert gas before the batteries to be treated are inserted, in order to avoid possible reactions with the air or other gases present, in particular with oxygen.

In order to ensure the correct functioning of the method according to the invention, H2O must advantageously be added between 1 and 10 times the weight of the batteries, accumulators and the like to be inerted. The amount of H2O to add also depends on the type of batteries and accumulators to be inserted. For safety reasons, more H2O is required if the batteries contain substances that may release hydrofluoric acid or hydrochloric acid. These acids are especially dangerous when they are in gaseous form. Therefore, if enough H2O is present, they react to form an aqueous solution: e.g. B. H3O+F− or H3O+Cl−. In aqueous form, these chemical species are easy to handle, and adding a base to correct the pH value makes them even less hazardous/inert.

DESCRIPTION OF THE DRAWINGS

A non-limiting example of a system according to the invention is described below with reference to an attached figure. Description of the Figures.

DETAILED DESCRIPTION OF THE INVENTION

Figure 1:
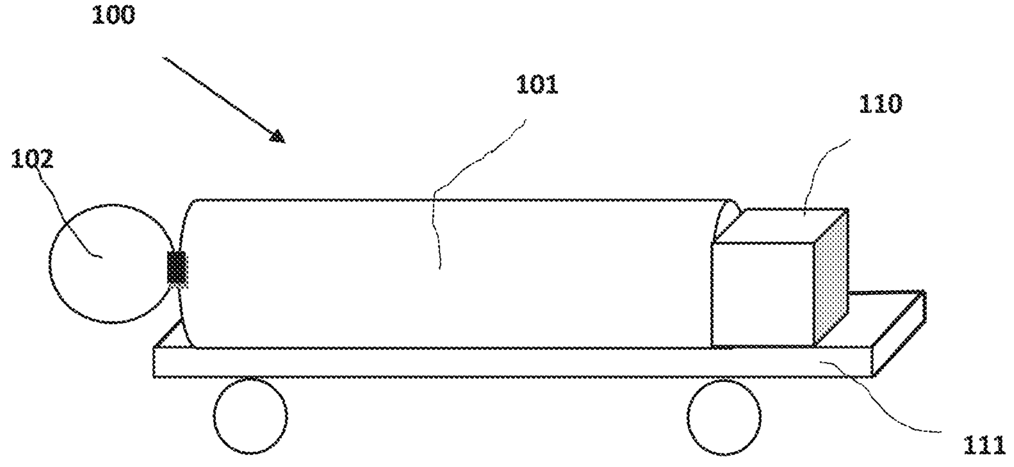
FIG. 1 is a schematic perspective view of a System according to the invention.
Figure 2:
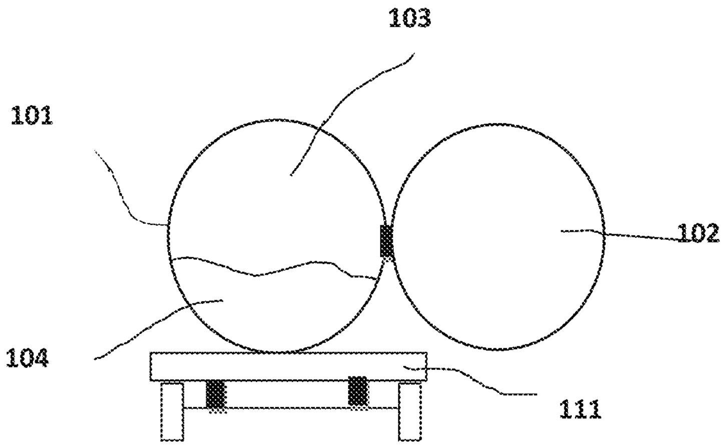
FIG. 2 shows a schematic rear view of a system according to the invention.

FIG. 1 with the reference number 100 shows a mobile system which is arranged on a mobile vehicle, e.g. a truck or a trailer, with a container 101 being arranged on a platform, for example a trailer 111, in which the method for inserting a battery, an accumulator, a cell and/or a vehicle with a battery, an accumulator, a cell is carried out. The container 101 has, for example, a cylindrical, tubular shape and has at least one door 102 to access the inside of the container 101.

Advantageously, the system 100 according to the invention comprises a ramp (not shown) which allows easy access for the battery, the accumulator or the vehicle into the inside of the container. Advantageously, inside the container 101 and/or in connection with the system according to the invention, a towing and/or pulling device, such as a trailer hitch or the like, is arranged to tow the battery, accumulator and/or vehicle and to accommodate the battery, accumulator within the container 101. Advantageously, the device tows the battery or vehicle into the inner chamber 103 of the container 101 placed on the platform 111 of a trailer, truck or similar.

The system 100 according to the invention comprises heating elements 110 for heating the environment inside the container 101. It can also include means for introducing inert gas into the inside of the container 101 and/or means for sucking air and the like from the inner chamber 103 of the container 101.

The battery, the accumulator or the vehicle containing it is towed into the inner chamber 103 of the container 101 and then the door 102 is closed. After the door is closed water is added.

Advantageously, the amount of water H2O is determined according to the mass of the battery, the accumulator, the charging cell and the like to be inerted. To ensure that sufficient H2O 104 is available during the treatment process, water is added from 1 to 10 times more than the weight of the mass of the battery. Reactive chemicals such as hydrochloric acid and hydrofluoric acid are bound by water vapour and liquid water. These chemicals combine with water to form aqueous solutions that are easier to handle and cause far fewer problems than their gases.

The contents of the container 101 is heated inside the container 101 by bringing the temperature between 120° C. and 370° C. The pressure inside the container 101, which becomes the reactor, reaches between 2 and 250 bar, depending on the temperature. It is advantageous that the temperature is kept below 250° C. and the pressure below 40 bar.

When most batteries, accumulators, charging cells and the like arrive in container 101 at a temperature of approx. 220° C. and a pressure of approx. 25 bar, the membrane and/or the separator between the anode and cathode collapses which leads to a short circuit of the battery, accumulator, charging cell. This short circuit also leads to an increase in temperature. Under the conditions mentioned above, hydrogen (H2), light hydrocarbons, CO2 and CO can form as products of the reaction between batteries/accumulators and water, wherein the content of which also varies depending on the state of charge of the batteries/accumulators.

The more the batteries to be treated are charged, the more H2 and light hydrocarbons can be produced. It is possible to use the evolved gases by recovering hydrogen (H2) or, for example, to drive a heat engine with the evolved gases to generate electricity.

Acids or bases can be added to stabilize the reaction in the container/reactor to regulate the pH value.

The container 101 can also have an outlet for H2, for example, which is advantageously mixed with air to render it harmless before the gas is released into the atmosphere. Advantageously, the exhaust can be equipped with an activated carbon filter to prevent the escape of harmful gases.

The system according to the invention can already carry sufficient water or be supplied by means of a small external fire truck, for example, and/or by means of hydrants and the like.

The method includes the following steps:

Inserting a battery, an accumulator, a cell or a vehicle containing a battery, an accumulator, a cell into a container/reactor 101, closing the door 102;

inserting H2O into the interior of inner chamber 103, advantageously inserting an inert gas and/or air into the inner chamber 103, bringing the contents of the inner chamber to a pressure of between 2-40 bar and a temperature of at least 100° C. and below 370° C.

The variants of the system with the method described above only serve to provide a better understanding of the process, the mode of operation and the properties of the solution presented; they do not restrict the disclosure by the implementation examples. The figures are schematic, with some of the essential properties and effects being clearly enlarged in order to emphasize functions, operating principles, configurations and technical characteristics. Accordingly, each function, principle, technical configuration and characteristic disclosed in the figures or in the text can be used freely and can be combined in any way with all claims, each characteristic in the text and in the other figures, other functions, principles, configurations and technical characteristics that are contained in this disclosure or result from it, are combined, so that all conceivable combinations of the solution described can be assigned. This also includes combinations between all individual representations in the text, i. e. on each page of the text, in the claims and also combinations between different variants in the text, in the dimensions and in the figures. The details of the device and method presented previously are presented in the text; however, it should be noted that they can also be used independently and also freely combined with each other. The relationships between the individual parts and sections shown in the figures, as well as their dimensions and proportions, are not to be understood as limiting. However, individual dimensions and proportions may differ from those shown. The claims do not limit the disclosure and thus the possible combinations of all the characteristics presented. All features characteristics are also disclosed here individually and in combination with all other characteristics.

REFERENCE NUMBERS

100 System according to the invention
101 Container/reactor
102 Door
103 Inner chamber
104 H2O
110 Heating elements
111 Platform

The invention claimed is:

1. A method of using a mobile system for treating a vehicle containing at least one of a battery, an accumulator, and a cell, that it is arranged on a mobile vehicle, the mobile system including at least one container/reactor in which a pressure is increasable from 2 to 40 bar, the container/reactor having at least one door for hermetically opening and closing the container/reactor, a heating element for raising the temperature inside the container/reactor to at least 100° C., and at least one $H_2O$ supply, said method comprising the following steps:

inserting the vehicle containing at least one of the battery, the accumulator, and the cell into the container/reactor;
closing the at least one door;
inserting $H_2O$ into the container/reactor; and,
bringing the container/reactor containing the inserted vehicle containing at least one of the battery, the accumulator, the cell to a pressure of 2-40 bar and a temperature of at least 100° C. and less than 370° C.

2. The method according to claim 1, wherein before the step of bringing inserted contents of the chamber/reactor to a pressure of 2-40 bar and a temperature of at least 100° C. and below 370° C., the method includes the step of introducing an inert gas into the chamber/reactor and/or removing air from the chamber/reactor.

3. The method according to claim 1, wherein the step of inserting the vehicle containing the battery, the accumulator, the cell into the container/reactor includes at least one device for pulling the vehicle containing the battery, the accumulator, the cell into the container/reactor.

4. The method according to claim 1, wherein the step of inserting the vehicle containing the battery, the accumulator, the cell into the container/reactor includes at least one ramp for accessing the container/reactor.

5. The method according to claim 1, wherein the container/reactor has a substantially cylindrical shape.

6. The method according to claim 1, wherein the method of treating is carried out on the mobile vehicle.

7. A method of using a mobile system for treating at least one of an accumulator, a battery, and a cell that it is arranged on a mobile vehicle, the mobile system including at least one container/reactor in which a pressure is increasable from 2 to 40 bar, the container/reactor having at least one door for hermetically opening and closing the container/reactor, a heating element for raising the temperature inside the container/reactor to at least 100° C., and at least one $H_2O$ supply, said method comprising the following steps:

inserting the at least one of the accumulator, the battery, and the cell into the container/reactor;
closing the at least one door;
inserting $H_2O$ into the container/reactor; and,
bringing the container/reactor containing the inserted at least one of the accumulator, the battery, and the cell to a pressure of 2-40 bar and a temperature of at least 100° C. and less than 370° C.

* * * * *